United States Patent [19]
Moberg

[11] 3,939,937
[45] Feb. 24, 1976

[54] SAFETY APPARATUS FOR SERVICE VEHICLE

[75] Inventor: James W. Moberg, San Jose, Calif.

[73] Assignee: Browning-Ferris Industries, Inc.

[22] Filed: Nov. 1, 1974

[21] Appl. No.: 519,840

[52] U.S. Cl.......... 180/77 D; 180/53 FE; 180/82 A; 192/4 A
[51] Int. Cl............................................. B60k 41/24
[58] Field of Search..... 180/77 R, 77 S, 77 D, 82 R, 180/53 FE; 192/4 A, 13 R, 83; 214/500, 515; 303/13

[56] References Cited
UNITED STATES PATENTS

| | | | |
|---|---|---|---|
| 1,925,893 | 9/1933 | Bacon | 180/77 R |
| 2,228,917 | 1/1941 | Walls | 192/83 R |
| 2,990,925 | 7/1961 | Bernotas | 180/82 A |
| 3,017,974 | 1/1962 | Lasley | 192/4 A |
| 3,050,165 | 8/1962 | Day et al. | 192/13 R |
| 3,059,716 | 10/1962 | Iserman et al. | 180/77 R |
| 3,233,765 | 2/1966 | Barnes | 214/500 |
| 3,516,525 | 6/1970 | Skaggs | 192/13 R X |
| 3,529,701 | 9/1970 | Gethmann et al. | 192/13 R X |
| 3,667,629 | 6/1972 | La Voie | 192/4 A |
| 3,679,018 | 7/1972 | Luft | 180/77 S |
| 3,692,156 | 9/1972 | Week | 192/4 A |

Primary Examiner—Kenneth H. Betts
Attorney, Agent, or Firm—Pravel & Wilson

[57] ABSTRACT

Safety apparatus for simultaneously placing in neutral the automatic transmission of a service vehicle subject to frequent starting and stopping without moving the gearshift lever and setting the vehicle brake from a second drive station removed from the first drive station such that the vehicle is safely but temporarily parked.

7 Claims, 4 Drawing Figures

SAFETY APPARATUS FOR SERVICE VEHICLE

Background of the Invention

The field of this invention is safety devices for operating service trucks under repeated starting and stopping conditions.

The term "service" vehicle, as used in this application, includes any type of vehicle used for providing services from a street to a home, apartment or the like and thus subject to frequent starting and stopping during use. For example, solid refuse collection trucks are used to collect refuse on a house-to-house basis along a street. Thus, it may be necessary for a refuse collection vehicle to make hundreds of starts and stops during a day.

It has been recognized that the use in a service vehicle of a second or right hand drive station remote from the normal or left hand drive station can save some manpower. For example, U.S. Pat. No. 1,925,893 discloses a milk delivery truck having auxiliary controls and U.S. Pat. No. 3,059,716 discloses a refuse collection vehicle with a remote control station. It has also been found advantageous to combine the vehicle controls to avoid multiple movements normally necessary in starting and stopping such vehicles. For example, U.S. Pat. Nos. 3,059,176; 1,903,977 and 1,874,526 disclose controls for both brakes and clutches or shift levers for standard transmissions, which controls may even be actuated by the application of the brakes.

SUMMARY OF THE INVENTION

This invention relates to a new and improved safety apparatus for operating a service vehicle having a automatic transmission and first and second drive stations, wherein the automatic transmission has a gearshift lever at the first drive station and wherein the gearshift lever is in a drive position under frequent starting and stopping conditions. The apparatus of the preferred embodiment of this invention includes a brake-set means mounted at the second drive station for actuating the brakes of the vehicle independently of the first drive station. Safety means are mounted at the second drive station in-operative connection with the vehicle automatic transmission for neutralizing the automatic transmission, with the gearshift lever remaining in the drive position, with actuation of said brakes by said brake-set means.

The safety means of the preferred embodiment of this invention includes a flow diverting valve mounted with the automatic transmission for diverting fluid pressure from the automatic transmission in response to the actuation of the brake-set means. The flow diverting valve is controlled by a fluid signal source, which source is actuated by an electrical switch, which electrical switch is activated substantially simultaneously with the activation of the brake-set means.

The method of the preferred embodiment of this invention for operating a service vehicle which is capable of making repeated stops along a street or the like, which vehicle includes a normal first drive station having automatic transmission controls mounted therewith, includes the first step of operating a second drive station which is removed from the first drive station. The second drive station is utilized for actually operating the vehicle during repeated stopping and starting activities. The automatic transmission controls are placed in a drive position at the first drive station. A brake-set control is mounted at the second drive station for setting the vehicle brakes independently of the first drive station; and, the automatic transmission is neutralized from the second drive station, without moving the automatic transmission controls at the first drive station, substantially simultaneously with the setting of the vehicle brakes at the second drive station whereby the vehicle is quickly rendered safe and may be left temporarily unattended.

DESCRIPTION OF THE PREFERRED EMBODIMENT

Figure 1:
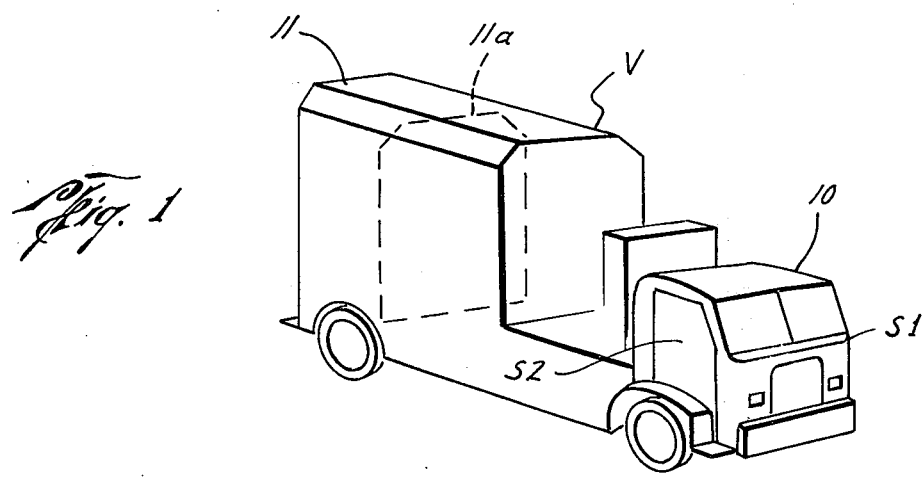
FIG. 1 is an isometric view, partly in schematic, of a refuse collection vehicle of the preferred embodiment of this invention.

Referring to the drawings, the letter V generally designates a service truck of the refuse collection variety which is used, for example, to make door-to-door refuse collections. The term "service" has been previously defined as including any of a variety of vehicles which are used to make multiple deliveries or pick-ups during a day, and in particular those vehicles used in making door-to-door deliveries in neighborhoods or the like. The refuse collection vehicle V of FIG. 1 basically includes a truck cab 10 having mounted therewith a refuse compartment 11. The vehicle V is powered by a main internal combustion engine which is mounted within the cab 10 in a well-known manner. The scored lines 11a represent a refuse compactor or ram which is hydraulically operated, by suitable means not shown, to compress or compact the refuse within the compartment 11. The compactor 11a, which is a well-known apparatus in the art, is powered by high pressure fluid. In the embodiment of the invention disclosed herein, a power take-off pump 12 is attached to a front end portion 14a of the main drive shaft for the internal combustion engine of the vehicle V. The power take-off pump 12 is connected to the main drive shaft portion 12a through a clutch 15. In one embodiment of this invention, the clutch 15 is electrically operated and is illustrated schematically in FIG. 4. The power take-off pump 12 receives hydraulic fluid from inlet line 12a and delivers hydraulic fluid at a higher pressure through outlet line 12b, the outlet line 12b is hydraulically connected to the compactor apparatus which has been designated as 11a. Thus whenever the clutch 15 is engaged, the main engine shaft 14a is used to drive the power take-off pump 12 for operating the compactor 11a.

Figure 4:
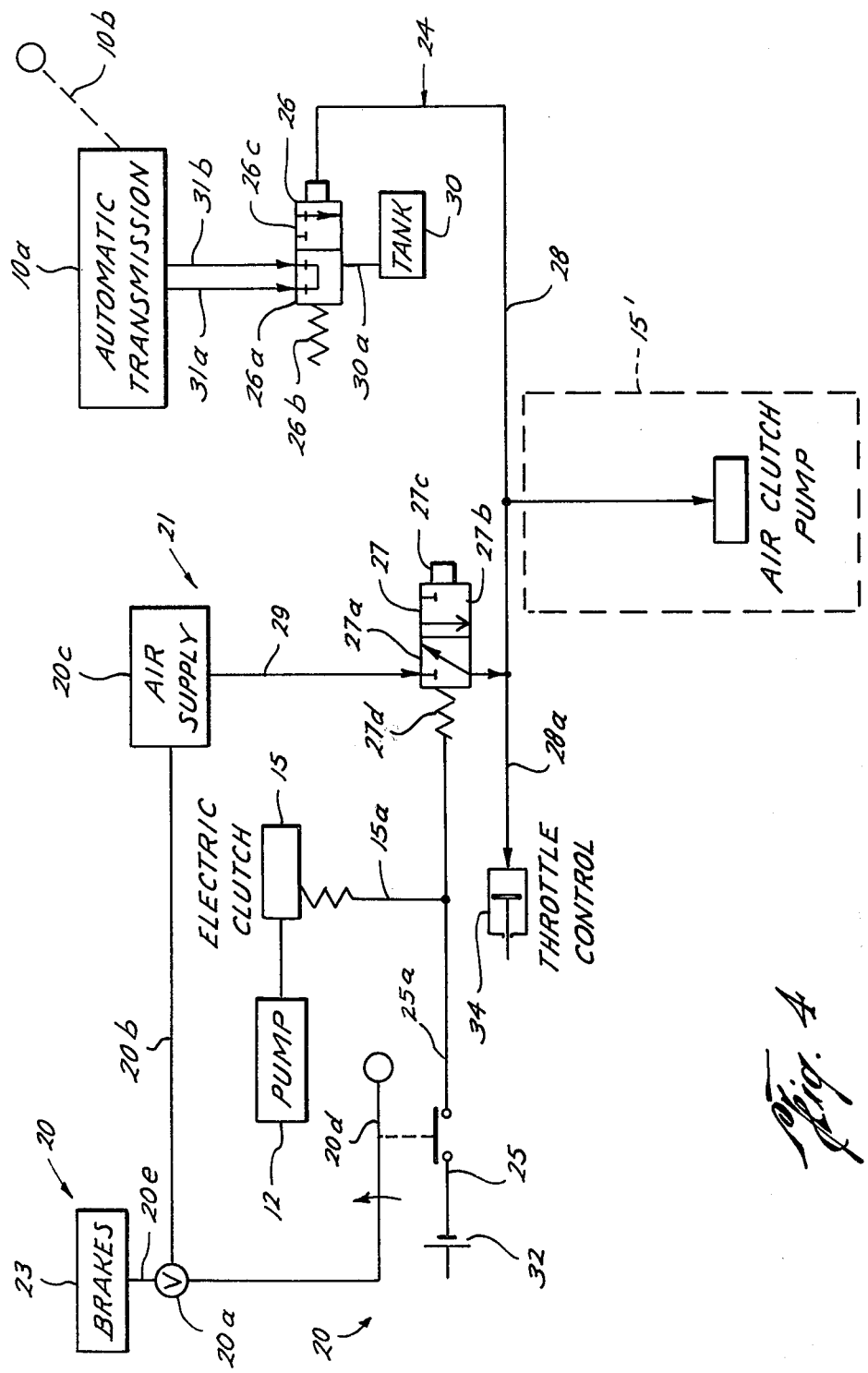
FIG. 4 is a schematic view of the safety apparatus of the preferred embodiment of this invention for neutralizing the automatic transmission upon actuation of the brakes from the right or auxiliary drive station.

The internal combustion or main engine mounted in the cab 10 is controlled by an automatic transmission 10a. Gearshift lever 10b for automatic transmission 10a is shown in FIG. 4. The vehicle cab 10 includes a main or normal drive station S1 which is located on the left side of the vehicle cab 10. The station S1 is equipped with the controls normally found in a main vehicle drive station of this nature. Thus, the drive station S1 will include a steering wheel for steering the vehicle, brake pedals for braking the vehicle and the gearshift lever 10b for controlling the position of the automatic transmission 10a. The gearshift lever 10b is movable between typical automatic transmission positions such as "neutral", "reverse", and "drive". Since this equipment is well known in the art, none of it will be described in any further detail. However, the automatic transmission utilized in the vehicle V is identified as automatic transmission, model No. MT 650, manufactured by the Allison Division of General Motors Corporation.

The vehicle V of the preferred embodiment of this invention includes a second or auxiliary drive station S2. The auxiliary drive station includes the controls illustrated in FIG. 3. Thus, the auxiliary drive station includes a steering mechanism generally designated as 16 which includes a second or auxiliary steering wheel 16a which may be used to drive the vehicle through steering linkage 16b, which extends between the steering mechanism 16 and the main steering mechanism mounted in the main drive station S1. Such steering linkage 16b is well known in the art. The auxiliary drive station S2 further includes a brake-set means generally designated as 20 which is utilized to set the vehicle brakes by hand. Further, a safety means generally designated as 21 is mounted adjacent to the brake-set means 20 in operative connection with the automatic transmission 10a for neutralizing the automatic transmission 10a with the gearshift lever 10b remaining in the drive position. The safety means 21 neutralizes the automatic transmission 10a substantially simultaneously with actuation of the brake-set means 20.

Figure 2:
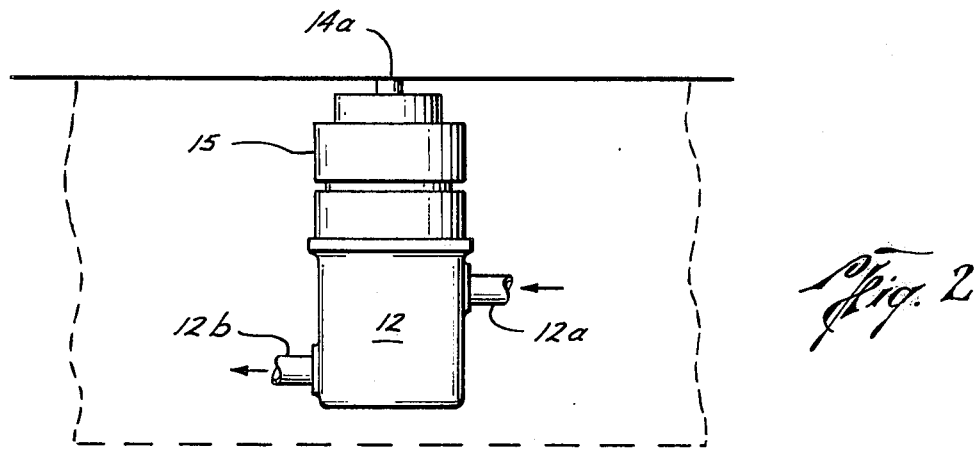
FIG. 2 is a top view of the power take-off pump connected to the main engine for the refuse collection vehicle of FIG. 1.

The brake-set means 20 includes a valve 20a which is connected through an air supply line 20b to an air supply 20c. The air supply 20c is supplied from any of the wellknown types of air pumps which are driven by the main vehicle engine. The valve 20a is opened and closed by means of hand lever 20d. The valve 20a is connected through line 20e to the vehicle brake system 23. The vehicle brake system 23 is a conventional pneumatic brake system wherein the vehicle brakes are set in response to the application through line 20e of air under certain pressures. Rotation of the hand lever 20d from the up position illustrated in FIG. 2 to a down, brake-setting position opens the valve 20a so that pressurized air from the air supply 20c passes into the vehicle brake system 23. In this manner, the brakes for the vehicle V are applied through rotation of the valve hand lever 20d. Thus, an operator can both steer the vehicle V through the steering system 16 and set the brakes through hand lever 20d from the auxiliary driving station S2, independently of the main drive station S1.

The safety means 21 is provided for placing the automatic transmission 10a in neutral from the auxiliary drive station S2 without effecting the position of the automatic transmission gearshift lever 10b, which is normally in the drive position during door-to-door vehicle operations. The safety means 21 is mounted adjacent to the brake air valve 20a and is operably connected to the automatic transmission 10a for neutralizing the automatic transmission in response to rotation of the air valve lever 20d to the down position. In this manner, the automatic transmission 10a is neutralized in response to the setting of the brake system 23. The safety means 21 includes a fluid power means generally designated as 24 which is connected with an electrical actuator switch 25 for neutralizing the automatic transmission 10a. The fluid power means 24 includes a flow diverting valve 26 which is connected to a solenoid-operated signal valve 27 by air line 28. The signal valve 27 is connected to the air supply 20c through air line 29.

The signal valve 27 is illustrated in a normally closed position 27a but is movable to an open position 27b through actuation of solenoid 27c. The solenoid 27c is electrically connected with actuator switch 25. The signal valve 27 is resiliently biased to the normally closed position by a spring 27d or other suitable bias means.

The flow diverting valve 26 is a three-way valve illustrated in the normally open position 26a. The flow diverting valve 26 is held in the normally open position by any suitable means such as spring 26b. The flow diverting valve 26 is movable to a closed position designated at 26c by the application of pressurized air from the air supply 20c through the signal valve 27 when moved to the open position 27b by actuation of the solenoid 27c.

A hydraulic tank 30 is connected through hydraulic line 30a to the flow diverting valve 26. The flow diverting valve 26 is connected to the automatic transmission 10a through lines 31a and 31b. In particular, the lines 31a and 31b are operably connected to the automatic transmission 10a such that flow from the automatic transmission 10a can be diverted when necessary to shift the automatic transmission to a neutral position without moving the gearshift lever 10b. In the preferred embodiment of this invention, as previously mentioned, the automatic transmission is a model MT 650 manufactured by the Allison Division of General Motors Corporation. In that particular automatic transmission, the lines 31a and 31b are connected to the 1-2 feed line between the 1-2 shift valve and the main selector valve.

When the flow diverting valve 26 is in the open position 26a, the hydraulic fluid from the 1-2 hydraulic line in the automatic transmission 10a flows through line 31a, through the normally opened passages designated in 26a and outwardly through line 31b back into the 1-2 feed line of the automatic transmission 10a. Thus, in the normally open position, the flow taken out of the 1-2 automatic transmission flow line is simply circulated through the flow diverting valve 26 and back outwardly into the 1-2 automatic transmission feed line.

However, when air pressure is applied through line 28 to the flow diverting valve 26, the valve 26 is moved to the closed position, which flow pattern is designated at 26c. In the closed position, flow through the flow line 31a is blocked but, flow through line 31b is passed outwardly through the closed valve 26c into the return tank 30, thus diverting and draining fluid pressure from this side of the 1-2 feed line. This diversion of fluid outwardly through line 31b causes the deactuation of certain drive position fluid plates and effectively shifts the transmission into neutral. Movement of the flow diverting valve 26 back to the open position and return of fluid in tank 30 back into the automatic transmission fluid system causes the automatic transmission 10a to shift back into the drive position. Thus, the automatic transmission 10a is operated between drive and neutral positions by moving the signal valve 27 to the open position and thus moving the flow diverting valve 26 to the closed position without having to alter the position of the gearshift lever 10b, which is located at the main driver station S1.

The switch 25 is illustrated schematically in FIG. 4 as being in electrical connection through line 25a with the solenoid 27c for the purpose of moving the signal valve 27 between the schematically illustrated, normally closed position at 27a and the open or signalling position illustrated at 27b. The actuator switch 25 is mounted adjacent to the valve 20 in alignment with the valve lever 20d such that actuator switch button 25b is depressed whenever the valve lever 20d is moved downwardly to set the brake system 23. In this manner, whenever the vehicle brake system 23 is set by opening the valve 20a, the valve lever 20d, which has been moved to a down position, depresses the switch button 25b thus closing the switch 25. The closing of the switch 25 allows a dc power source 32 to energize the solenoid 27c and move the signal valve 27 to the open position at 27b, thereby allowing pressurized air to pass through lines 29 and 28 and thus actuate the flow diverting valve 26.

The electric clutch 15 is connected through electric line 15a to the line 25a and thus to the dc power source 32. Thus, whenever the actuator switch 25 is depressed, power is also supplied to the electric clutch 15. The electric clutch is normally in an open or disengaged position; but, upon the receipt of an electrical signal through lines 25a and 15a, the electric clutch 15 is moved to a closed or engaged position such that the power take-off pump 12 is actually driven by the main shaft 14a of the vehicle engine. Such electrical clutches are well-known in the art.

A secondary air line 28a is connected to the main air line 28 and thus to the signal valve 27. The air line 28a is connected to a pneumatic throttle control 34 of a known variety. Whenever the signal valve 27 has been moved to the open position, air pressure is also supplied through line 28a to the throttle control 34. The throttle control 34 is of a known variety and is connected to the carburetion system for the main engine of the vehicle V. Whenever air under pressure is supplied through the line 28a, the throttle control 34 increases the engine rpm so that the main engine drive shaft 14a is operated at sufficient rpm to drive the power take-off pump 12 at desired fluid power pressure levels. Thus, the main engine rpm is increased through the throttle control 34 whenever the actuator switch 25 is closed, thereby increasing the main engine rpm simultaneously with the engaging of the electric clutch 15. In this manner, the compactor 11a is provided with sufficient hydraulic fluid at sufficient pressure levels to properly compact refuse within the refuse compartment 11.

In the alternative, the clutch mounted between the main engine drive shaft 14a and the power take-off pump 12 may be an air clutch 15', which is enclosed in scored lines in FIG. 4. The air clutch 15' is connected to the air supply line 28. In this manner, the air clutch is moved to an engaged position whenever the signal valve 27 is moved to the open position illustrated at 27b. This, of course, occurs whenever the actuator switch 25 is closed. Therefore, an air clutch 15' can be utilized to actuate the power take-off pump substantially simultaneously with the shifting of the automatic transmission 10a to a neutral position, all of which operations occur by the rotation of the valve lever 20d to the down position at the auxiliary drive station S2.

In operation and use of the refuse collection vehicle V in conjunction with the brake-set means 20 and the safety means 21, the vehicle V is first driven from its storage plant to location using the normal, main drive station S1. After the vehicle V is in the neighborhood or the like where door-to-door pick-ups will be made, the driver will move from the main drive station S1 to the auxiliary drive station S2. This may be accomplished by having another person move into the auxiliary drive station S2 and rotate the valve lever 20d to a down position, which will automatically neutralized the automatic transmission in a manner heretofore described. The driver then moves around the cab 10 to the auxiliary drive station S2 and thereafter operates the vehicle V during door-to-door collections from the auxiliary drive station S2 exclusively. The driver also may move from the main drive station S1 to the auxiliary drive station S2 by putting the automatic transmission gearshift lever 10b in the neutral position or parked position and then moving to the auxiliary station. Thereafter, the driver can reach over to the main drive station S1 and move the gearshift lever 10b to the drive position. Thereafter, the driver can totally operate the vehicle V from the auxiliary drive station S2.

The vehicle V is operated from the auxiliary drive station S2 in the following manner. Whenever the operator desires to stop, he rotates the valve lever 20d downwardly to the down position in which the valve lever 20d depresses the actuator switch button 25b. Movement of the valve lever 20d to the down position causes the application of air under pressure to the brake system 23 which causes the vehicle to come to a stop in a known manner. Simultaneously with the actuation and setting of the brake system 23, the switch 25 is closed and electrical power is provided to solenoid 27c. Actuation of the solenoid 27c moves the signal valve 27 to the closed position illustrated at 27b. In the closed position, air is supplied from the air supply 20c, through the signal valve 27 to the air line 28. Air pressure in line 28 causes the flow diverting valve 26 to move to an open position. In the open position, flow through hydraulic line 31 is blocked. And, in the open position, flow through hydraulic line 31b is diverted from line 31b and thus from the automatic transmission 1-2 feed line into the return tank 30. This places the automatic transmission 10a in the neutral position without moving the gear lever 10b.

The electric clutch 15 is also closed at the same time that the brake system 23 is set and that the automatic transmission 10a is neutralized. The closing of the switch 25 causes the application of a suitable electrical signal to the electric clutch to close the electrical clutch so that the power take-off pump 12 can be driven through a main engine drive shaft front portion 14a. Further, at the same time, air is supplied through the signal valve 27 through line 28a and thus to throttle control 34. The receipt of pressurized air by the throttle control 34 causes an increase in the engine rpm to provide proper rpm levels for driving the power take-off pump 12, which in turn operates the compactor 11a. Thus the vehicle V can be completely shut down safely and quickly simply by rotating the valve lever 20d. Thus the operator can safely stop the vehicle and place the automatic transmission in neutral from the auxiliary drive station S1. Certainly, when the vehicle V is utilized to make hundreds of stops per day, the amount of time and labor saved is enormous.

Figure 3:
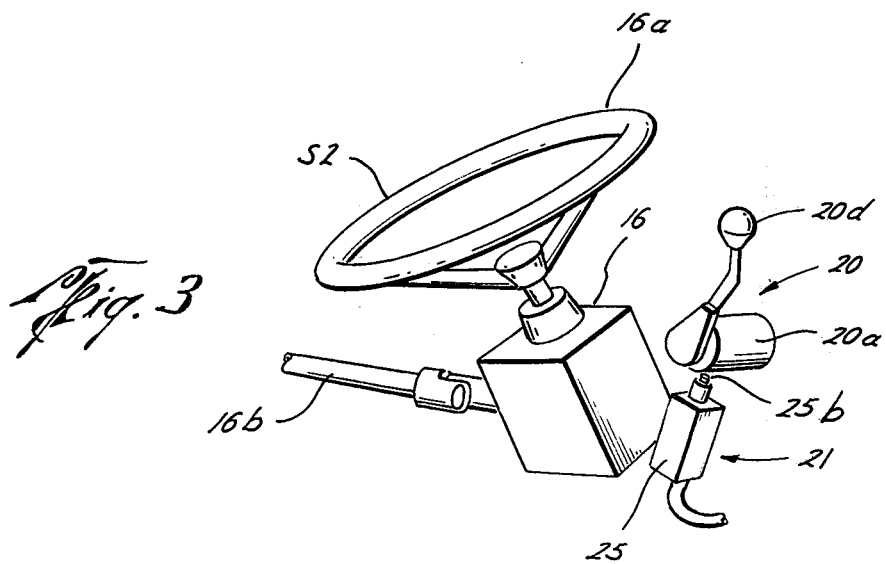
FIG. 3 is an isometric view of the auxiliary drive station controls mounted at the right side of the vehicle.

Whenever it is desired to start the vehicle again, the operator rotates the valve lever 20d to the up position illustrated in FIG. 3. Rotation of the lever 20d to the up position closes the valve 20a and releases the air pressure applied to the brakes 23 thereby releasing the brakes 23. At the same time, the actuator switch 25 is opened thus cutting off power to the solenoid 27c, which allows the spring bias 27d to move the signal valve 27 to the normally open position illustrated at 27a. Movement of the signal valve 27a to the open position cuts off the supply of pressurized air to lines 28a and 28, which allows the spring bias 26b of the flow diverting valve 26 to return the valve to the normally open position at 26a. In the normally open position, the flow diverting valve portion 26a is utilized to interconnect the hydraulic lines 31a and 31b and thus allow substantially uninterrupted flow within the transmission 1–2 feed line so that the transmission operates in the drive condition again. In this manner, the vehicle V may be quickly started up again after stopping merely by the rotation of the valve lever 20d.

Thus, in use of the vehicle V in making multiple starts and stops during a work period, the driver may quickly and easily start and stop the vehicle by simply rotating the hand lever 20d between up and down positions, thereby totally operating the vehicle during door-to-door collections without having to return to the main drive station and without having to make multiple hand and/or foot movements to set the brake, place the transmission in neutral, actuate the power take-off pump and increase the rpm of the idling main engine.

Although the neutralizing system has been described herein as operating substantially simultaneously with or in response to the brakes at the second drive station, it should be understood that it is within the scope of this invention to utilize the neutralizing system entirely independent of the brake system of the vehicle.

The foregoing disclosure and description of the invention are illustrative and explanatory thereof, and various changes in the size, shape, and materials as well as in the details of the illustrated construction may be made without departing from the spirit of the invention.

I claim:

1. Apparatus for operating a service vehicle making frequent starts and stops having a primary engine, an automatic transmission and first and second drive stations, wherein said automatic transmission has a gearshift lever at said first station, and wherein said gearshift lever is maintained in a drive position under such conditions, comprising:
   brake-set means mounted at said second drive station for actuating the brakes of said vehicle;
   safety means mounted at said second drive station in operative connection with said automatic transmission for neutralizing said automatic transmission with said gearshift lever remaining in said drive position substantially simultaneously with said brake-set means actuating the brakes of said vehicle;
   pump means operably connected to the primary engine for providing hydraulic power to a power take-off unit substantially simultaneously with the actuation of said brakes; and
   throttle control means for adjusting the throttle of said internal combustion engine substantially simultaneously with the actuation of said brakes.

2. The structure set forth in claim 1, wherein said safety means includes:
   fluid power means for neutralizing said automatic transmission; and
   an actuating electrical switch mounted with said brake-set means for actuation in response to actuation of said brake-set means, said electrical switch being operably connected with said fluid power means for actuating same.

3. The structure set forth in claim 2, including:
   said fluid power means includes means diverting pressurized fluid from said automatic transmission for neutralizing same.

4. The structure set forth in claim 1, wherein:
   said pump means of said vehicle includes a power take-off compacting pump connected through a normally disengaged clutch to the primary engine of said vehicle; and
   said safety means includes means for engaging said clutch substantially simultaneously with the neutralizing of said transmission whereby said power take-off pump is driven only when said brakes are set and said transmission is neutralized.

5. The structure set forth in claim 1, wherein said safety means includes:
   a flow diverting valve mounted with said automatic transmission, said flow diverting valve being normally in a closed position but being movable to an open position for diverting sufficient fluid from said automatic transmission to neutralize same in response to a fluid signal;
   a fluid signal source connected to said flow diverting valve, said fluid signal source being controlled by an electrical switch; and
   said electrical switch being actuated by said brake-set means.

6. Apparatus for operating a service vehicle making frequent starts and stops having a primary engine, an automatic transmission and first and second drive stations, wherein said automatic transmission has a gearshift lever at said first station, and wherein said gearshift lever is maintained in a drive position under such conditions, comprising:
   brake-set means mounted at said second drive station for actuating the brakes of said vehicle;
   safety means mounted at said second drive station in operative connection with said automatic transmission for neutralizing said automatic transmission with said gearshift lever remaining in said drive position;
   said safety means including a flow diverting valve mounted with said automatic transmission, said flow diverting valve being normally in a closed position but being movable to an open position for diverting sufficient fluid from said automatic transmission to neutralize same in response to a fluid signal;
   said safety means further including a fluid signal source connected to said flow diverting valve, said fluid signal source being controlled by an electrical switch, and said electrical switch being actuated by said brake-set means;
   said fluid signal source includes an electrically actuated signal valve connected with a fluid supply, said signal valve being normally closed, but movable to an open position to provide a fluid signal to said flow diverting valve; and
   said electrical switch being mounted at said second drive station adjacent to said brake-set means, said switch being electrically connected to said signal valve for providing an electrical signal for opening said signal valve substantially simultaneously with the actuation of said brakes.

7. Apparatus for operating a service vehicle making frequent starts and stops having a primary engine, an automatic transmission and first and second drive stations, wherein said automatic transmission has a gearshift lever at said first station, and wherein said gearshift lever is maintained in a drive position under such conditions, comprising:
brake-set means mounted at said second drive station for actuating the brakes of said vehicle;
safety means mounted at said second drive station in operative connection with said automatic transmission for neutralizing said automatic transmission with said gearshift lever remaining in said drive position;
said brake-set means including an operator valve mounted at said second station including a handle movable between an initial and a brake-setting position, said operator valve controlling the supply of fluid to said brakes for setting and releasing said brakes; and
said safety means including an electrical control switch mounted adjacent to said handle, said handle actuating said switch in a brake-setting position whereby said control switch is actuated substantially simultaneously with movement of said operator valve handle to a brake-setting position.

* * * * *